(12) United States Patent
Fan et al.

(10) Patent No.: US 9,684,680 B2
(45) Date of Patent: Jun. 20, 2017

(54) VERSION CONTROL METHODOLOGY FOR NETWORK MODEL

(75) Inventors: Yingfeng Fan, Shanghai (CN); Bo Su, Toronto (CA); Hongxiang Qiu, Shanghai (CN); Bruce Alan Scovill, Aurora, CO (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 14/129,117

(22) PCT Filed: Jul. 12, 2011

(86) PCT No.: PCT/CN2011/001149
§ 371 (c)(1),
(2), (4) Date: Dec. 24, 2013

(87) PCT Pub. No.: WO2013/006985
PCT Pub. Date: Jan. 17, 2013

(65) Prior Publication Data
US 2014/0149369 A1    May 29, 2014

(51) Int. Cl.
*G06F 17/30*    (2006.01)
*G06F 17/50*    (2006.01)

(52) U.S. Cl.
CPC ........ *G06F 17/30309* (2013.01); *G06F 17/50* (2013.01); *G06F 2217/04* (2013.01)

(58) Field of Classification Search
CPC ......... G06F 17/30309; G06F 17/30575; G06F 17/30365; G06F 17/30368; G06F 17/30345; G06F 17/30174; G06F 17/30348; G06F 17/30353; G06F 17/30607; G06F 17/50; G06F 8/71
See application file for complete search history.

(56) References Cited

U.S. PATENT DOCUMENTS

| | | | | |
|---|---|---|---|---|
| 5,813,009 A | * | 9/1998 | Johnson | ............ G06F 17/30017 707/695 |
| 8,037,032 B2 | * | 10/2011 | Pershin | ............... G06F 11/1451 707/602 |
| 2001/0027457 A1 | * | 10/2001 | Yee | ........................... G06F 8/71 |

(Continued)

FOREIGN PATENT DOCUMENTS

| | | |
|---|---|---|
| CN | 101789042 | 7/2010 |
| CN | 101894104 | 11/2010 |

OTHER PUBLICATIONS

PCT Search Report, Apr. 5, 2012.

*Primary Examiner* — James Trujillo
*Assistant Examiner* — Aida Tessema
(74) *Attorney, Agent, or Firm* — Eversheds Sutherland (US) LLP

(57) ABSTRACT

Disclosed are methods and apparatus for providing version control for a model. A database (102) is divided into three logical areas corresponding to working model area (120), full model area (122), and permanent model area (124). Data, which may be CIM formatted data, imported into the model is validated against data previously stored in the full model area (122) and version controlled based in part on timestamp data. The version controlled data may then be exported for use by network applications. Imported data may come from a power system utility while the exported data may be used for control of such a utility.

6 Claims, 2 Drawing Sheets

(56) References Cited

U.S. PATENT DOCUMENTS

| | | | |
|---|---|---|---|
| 2002/0116457 A1* | 8/2002 | Eshleman | H04L 29/06 709/203 |
| 2006/0294159 A1* | 12/2006 | Dettinger et al. | 707/203 |
| 2007/0005666 A1 | 1/2007 | Klein et al. | |
| 2007/0027938 A1* | 2/2007 | Clarke | 707/204 |
| 2008/0091742 A1* | 4/2008 | Marshall | G06F 17/30241 |
| 2008/0097626 A1* | 4/2008 | Reed | G05B 19/4184 700/30 |
| 2009/0083056 A1 | 3/2009 | Gole et al. | |
| 2009/0183056 A1* | 7/2009 | Aston | 714/799 |
| 2010/0082580 A1* | 4/2010 | DeFrang | 707/706 |
| 2010/0169288 A1* | 7/2010 | Brown | G06F 17/30309 707/695 |
| 2010/0191774 A1* | 7/2010 | Mason et al. | 707/797 |
| 2011/0218964 A1* | 9/2011 | Hagan | G06F 17/30581 707/626 |
| 2012/0191679 A1* | 7/2012 | Takebe | G06F 17/30377 707/703 |

* cited by examiner

VERSION CONTROL METHODOLOGY FOR NETWORK MODEL

FIELD OF THE INVENTION

The present subject matter is directed to methodologies for providing version control for a network model for an electric utility.

BACKGROUND OF THE INVENTION

In an electric utility, there are usually several systems that maintain and/or utilize data representing the structure of the electrical network. These systems may include, without limitation, Geographic Information Systems (GIS), Design Systems, CAD Systems, Asset Management Systems, SCADA Systems, Outage Management Systems (OMS), Distribution Management Systems (DMS), and Energy Management Systems (EMS)

Some of these components may be "homegrown" within a utility, while others are likely to be commercially available products, or site-specific implementations based on such products. Model management is a term that may be used to refer to the processes associated with maintaining consistency between network representations stored by these various systems and the real-world network.

Clearly, model management is about integration and synchronization. Previous efforts have been made to integrate existing OMS and DMS product offerings. One area in which it is expected that previous experiences can be leveraged to improve energy management and control systems, such as an OMS/DMS, is that of GIS Data Integration. For example, it would be desirable to develop the ability to accept network data from an external GIS to populate the operational OMS/DMS thus reducing the time and effort to set up and deploy an OMS/DMS.

It is recognized that in many deployments, such integration would require the transformation of network information from a geographic to a schematic form. In this case, the chosen path for integration between systems was the IEC TC57 WG13 and WG14 61968 61970 model. This is simply referred to as the CIM model and is a standard for exchanging the electrical network between systems. The data is both initial load and incremental updates to the network as distribution networks change frequently.

It would be advantageous, therefore, to provide a methodology of managing a large-scale normal state network model from the electric power transmission and distribution domain. It would be further advantageous to provide a methodology wherein frequently changed normal state network data can be stored and version controlled so that the data may be conveniently used by other applications.

BRIEF DESCRIPTION OF THE INVENTION

Aspects and advantages of the invention will be set forth in part in the following description, or may be obvious from the description, or may be learned through practice of the invention.

The present subject matter relates to a method for providing version control for an electrical network model. The method provides a database that is divided into plural logical areas including at least a working model logical area and a permanent model logical area. Data is imported into the working model logical area and version information that is based at least in part on a timestamp is associated with the imported data. The imported data and associated version information is then stored in the permanent model logical area.

In other embodiments, the method provides a full model logical area in the database and provides for importing full model data into the full model logical area. In such embodiments, imported incremental change data is validated at least in part on the full model data and merged with data stored in the working model logical area. These methods also provide for storing the merged data in the full model logical area.

The present subject matter also relates to methods for controlling operation of a network. These methods provide a database that is divided into plural logical areas including at least a working model logical area and a permanent model logical area. These methods provided for importing data into the working model logical area, associating version information that is based at least in part on a timestamp with the imported data, storing the imported data and associated version information as version controlled data in the permanent model logical area, and exporting the version control data for use by network applications. Again the standard CIM is used for communicating the model to other systems. In selected further embodiments, these methods further provide a full model logical area in the database in which full model data is imported. These selected embodiments provide for validating imported incremental change data based at least in part on the full model data, merging validated incremental change data with data stored in the working model logical area, and storing the merged data in the full model logical area. In selected methods, validation is based at least in part on a profile of a standard model and may also be based at least in part on phase and connectivity information.

The present subject matter also relates to an apparatus for controlling operation of a network. Such apparatus may correspond to a database divided into plural logical areas including at least a working model logical area and a permanent model logical area. The apparatus may also include a data import manager for receiving data into the working model logical area, a version control configured to associate version information based at least in part on a timestamp with the data received by the data import manager, an archive manager configured to store the imported data and associated version information as version controlled data in the permanent model logical area of the database, and an export manager configured to export the version control data for use by network applications.

In selected particular embodiments, the apparatus may also include a full model logical area in the database, a validation manager configured to validate imported incremental change data received by the import manager based at least in part on data stored in said full model logical area, a baseline manager configured to merge validated incremental change data with data stored in the working model logical area, and a database manager configured to store the merged data in the full model logical area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
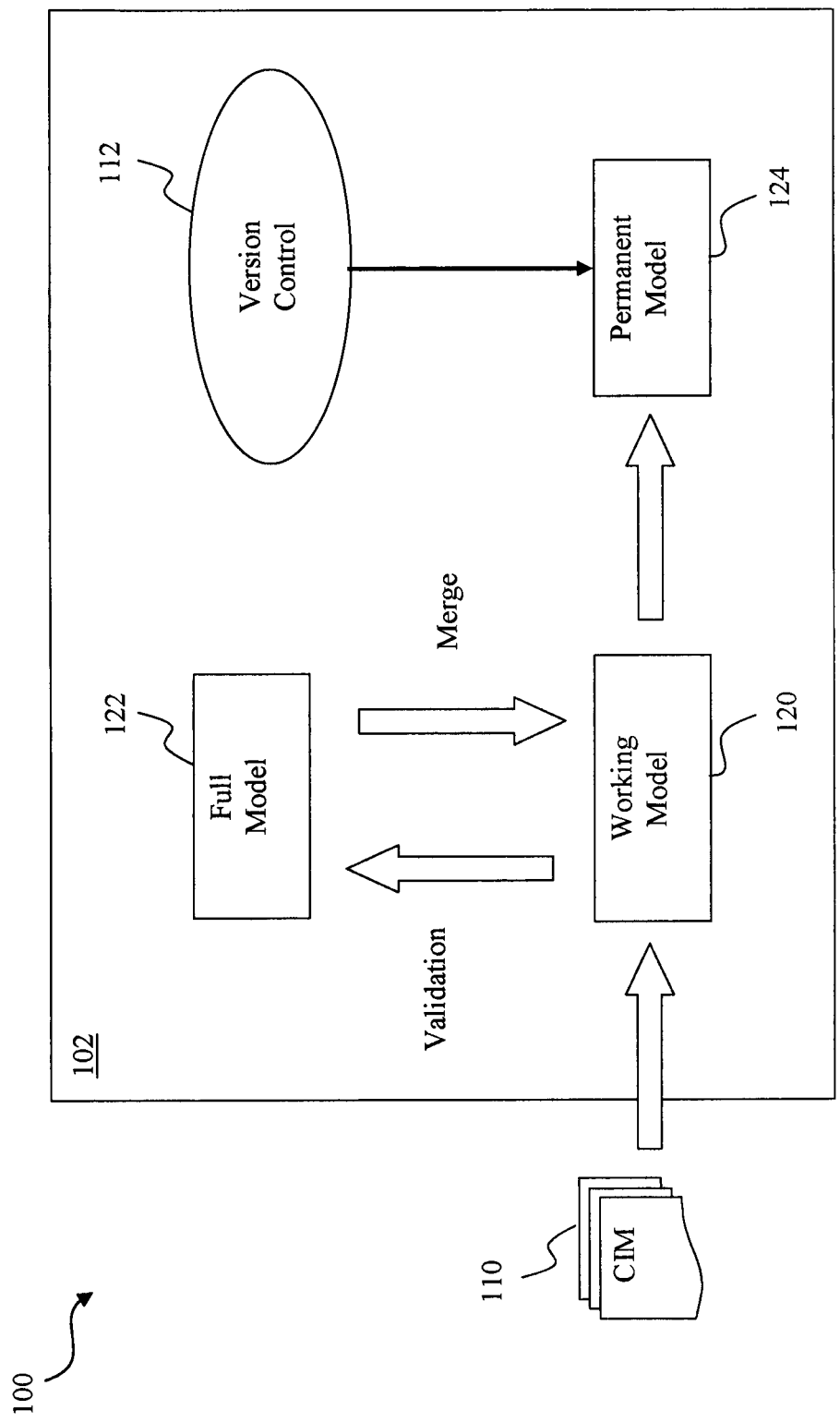
FIG. 1 provides an overview of a model exchange platform incorporating version control in accordance with present technology.

Repeated use of reference characters throughout the present specification and appended drawings is intended to represent the same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In accordance with present technology, a modeling solution has been provided that allows electrical network data to be entered once and used in multiple places while making it possible to integrate multiple and varying systems including GIS and operational systems. Further, the present technology provides control over the processes associated with making network data available for use in different places.

With reference to FIG. 1, a model exchange platform (MEP) 100, constructed in accordance with present technology, is designed to manage normal state network models that can be applied, for example, in the operation of electrical utilities. Those of ordinary skill in the art will appreciate, however, that the present subject matter may be employed with other types of network models as well.

When a normal state network model is imported from other applications by the MEP 100, the MEP is able to validate the data, store the data, and version control the validated data automatically. Once the data is version-controlled, the data can be exported, to be used by other applications or systems within the utility.

As represented in FIG. 1, all normal state network CIM 110 that is imported into the MEP 100 is stored into a database 102 so that the system may version control 112 the data within the database. Database 102 is divided into three logical model areas corresponding to Working Model area 120, Full Model area 122, and Permanent Model area 124. Each model area 120, 122, 124 has its own functional purpose as outlined below.

Working Model area 120 is used to temporarily store the original CIM data 110 imported from, for example, a power system utility (not separately illustrated). This imported CIM data 110 may correspond to incremental change data. Such incremental changes of the normal state of the network are parsed and mapped into records in the database.

Full Model area 122 stores the validated and merged models from the Working Model area 120. Validation is based on the latest full model. In an exemplary embodiment, the model data may be imported formatted in the data standard of the IEC TC57 Working Groups 13 and 14. Those of ordinary skill in the art will appreciate that this standard corresponds to International Electrotechnical Commission Technical committee 57 standards relating to energy management (Working Group 13) and distribution management (Working Group 14). Validation occurs based on profiles of the 61968 and 61970 standard models developed for these Working Groups as are known by those of ordinary skill in the art. In accordance with present technology, the model may also be validated for phases and connectivity.

Permanent Model area 124 stores all the validated incremental changes from Working Model area 120, which will be labeled with a version and stored permanently.

MEP 100 version control models in the Permanent Model area 124 based on a timestamp. In an exemplary configuration of the present subject matter, an automatically created version may include the following information: version ID, version name, model type, model source, model summary information, version operator, version created timestamp, comments, and other related information. The version ID may be incremented based on the import timestamp.

There are several components to the network data that are utilized in operational systems that may be generally referred to as Back-Office Systems that generally are concerned with various information types. These include, without limitation, Asset Information, Connectivity Information, Special Information, and Customer Information.

Asset Information includes both objects and data. Objects include, without limitation, Supply Points, i.e., Power Sources, Devices, Conductors, and Demand Points including both metered and unmetered points. Data includes, without limitation, Identifiers, Electrical Attributes, Control Information, and Measurement Information. In certain instances, an asset can be defined across multiple systems. In these instances, the model manager may be configured to act as a "phone book" for managing what system has what information. In this way, the model manager may be configured to support queries and thereby provide further system information.

Connectivity Information describes how assets are connected to one another to support the flow of power. Spatial Information provides information regarding asset location while Customer Information provides information regarding Customers that are connected to the network.

The systems that provide these data, either initially or on an ongoing basis, are diverse or include, without limitation: Asset Management Systems, SCADA Systems that provide identifiers and control and measurement definitions, GIS, CIS, CAD systems, and Legacy Databases.

In some ways, all of these systems can be generalized into possible providers of network definition data. It is possible that components of operational systems will even play this role, if, for example, network data maintenance is carried out using capabilities that those systems provide.

In most of the world, electrical utilities record their assets and their geographic layout in a GIS. This is especially true for OMS systems and increasingly for DMS systems. Any of a number of GIS systems is likely to be in place at a utility, including, for example, those developed by GE Smallworld, Intergraph and ESRI.

Figure 2:
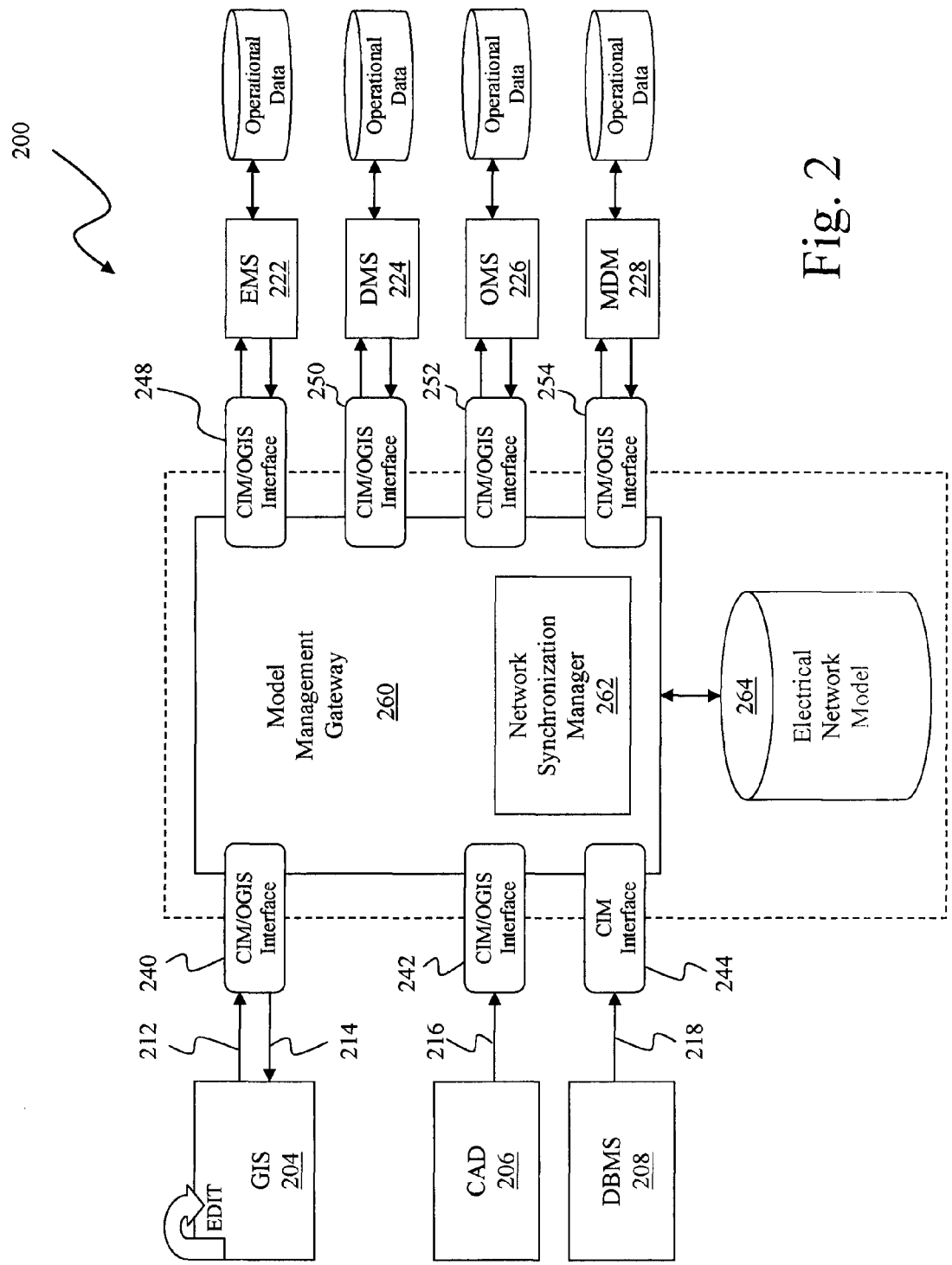
FIG. 2 illustrates an exemplary conceptual architecture for model management.

With reference to FIG. 2, generally it is expected that the data provided by a GIS 204 will include some, but not all, asset information connectivity information and spatial information. Information coming from a GIS may or may not include identifiers that can be understood by all systems. Data from other systems may need to be matched up with GIS data before it can be used in operational systems.

As well as providing network information in an initial "bulk load" fashion, the GIS may be employed to provide incremental updates. The timing and packaging of such incremental updates is likely to be quite variable. Updates may be available in a "proposed" form before they are carried out in the field, or they may be available only as "as-built" updates. They may be packaged in chunks that correspond closely to an originating design/construction effort or they may be quite unstructured.

Besides acting as sources of data, it is likely that a GIS 204 will also receive network data. This data may be of quite low volume, such as permanent changes being fed back to the GIS from operational systems. Alternatively, there is the potential for higher volumes of data to be received by the GIS if it isn't the place where updates are originated.

In some utilities, CAD 206 systems are the primary repository of graphical, i.e., geographic or schematic, data. This data may be in addition to data stored in a GIS, and may only be maintained for certain parts of the network. Essentially, the information content of such repositories is likely to be similar to that stored in a GIS and may include some, but not all, asset information, connectivity information, graphical information, and the DBMS 208.

Other systems of one sort or another are likely to provide information that is required to support the use of operational systems. In some situations, all the connectivity may come from a system that can't reasonably be called a GIS or CAD system. In others, separate systems are likely to be the source of smaller components of the network definition (e.g., control and measurement definitions, physical asset information, and common or specialized identifiers).

Data exchange through the Model Management system may be carried out according to the Common Information Model (CIM) specified as part of the IEC 61970 series of standards. The CIM recommends the use of the Geographic Markup Language (GML) for geographic and schematic forms of presentation for networks. Multiple forms of presentation can be handled by the combination of CIM and GML. Both CIM and GML call for XML-based encoding.

CIM/GML-based interfaces, such as interfaces 240, 242, 244, 248, 250, 252, 254, correspond to points at which the Model Management Gateway is abstracted from the systems with which it interacts. Such systems can be configured to provide or accept CIM/GML-based constructs. Model Management Development should include close coordination with future development of CIM/GML-based interfaces to back-office and operational systems. Most of the interfaces 240, 242, 244, 248, 250, 252, 254 are configured for two-way communications as illustrated by the associated exemplary directional arrows 212, 214, 216, 218, to support the flow of data in and out.

Model Management Gateway 260 includes Network Synchronization Manager 262 and the Electrical Network Model 264, which stores the information exchanged via the CIM and GML. The Model Management Gateway 260 performs a number of functions, including: acting as a staging and aggregation area for data until corrected and approved for use in Operational Systems; exchanging data based on CIM and OGIS (GML) standards; supporting different data input systems (GIS, CAD, RDBMS); supporting multiple target operational systems; and extending existing products, for example, Enterprise Gateway.

Model Management Gateway 260 responsibilities include:
synchronization of different network representations used in operational and "back-office" systems;
acceptance of information defining the structure of the network from many and varying sources;
maintenance of a record of the structure of the electric network;
aggregation of network information into a combined form that fulfills the needs of operational systems;
validation of the integrity of network information (e.g. phasing, voltage levels, etc.);
correction and augmentation of network information;
management of multiple static forms of presentation for electrical networks (including geographic and schematic forms);
making initial network information available to operational systems;
accepting updates and corrections from operational systems;
feeding corrections and other updates back to "source" systems;
accepting packaged updates from "source" systems;
making packaged updates available to operational systems;
versioning of network information; and
control over the processes associated with synchronizing network representations.

Because there are several possible systems that may provide data, the Model Management Gateway 260 may be configured as the staging ground for that data. The stored form of the model may be readily convertible to CIM and GML encodings, while at the same time providing the means to provide the services required of the Model Management framework.

In an exemplary configuration, Oracle may be used as a repository for the Enterprise Gateway. Further, in an exemplary configuration, Oracle Locator technology may be used for storing the geometric parts of the model including both geographic and schematic models.

Network Synchronization Manager 262 is the master manager of the operation because it will determine or be told from outside sources which data has to be processed and which processes are to be invoked to process the data. In this regard, it is important that Network Synchronization Manager 262 be configured to take data from other systems as input for the process flow of the data.

Network Synchronization Manager 262 responsibilities include:
data import;
data aggregation (adding data from other sources);
data validation/inspection;
data cleanup;
data acceptance; and
data export.

Operational Systems including EMS 222, DMS 224, OMS 226, and MDM 228 have multiple responsibilities. Within the context of Model Management, they need to be configured to:
Accept initial network definitions and graphical presentations in CIM/GML form;
Accept incremental updates to network definitions and graphical presentations in CIM/GML form;
Maintain operational network representation;
Provide support for "off-line" representations (e.g. case studies, simulation);
Provide final control over introduction of updates; and
Notify Model Management Gateway 260 of introduced updates.

The present subject matter provides a reasonable and proven method of version controlling normal state network models in industry fields that can be easily extended and customized based on different business requirement. With this methodology, the system is able to handle/version control large-scale CIM data efficiently and effectively, and provide model validation. It is especially useful where the data changes frequently and needs to be validated with strict rules. Moreover, it provides a fundamental data structure (full model), which is the snapshot for the current whole model. Based on this, utilities can easily develop a variety of applications for their business.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for providing version control for a model, comprising:
   providing a database;
   dividing the database into plural logical areas including at least a working model logical area and a permanent model logical area;
   importing data into the working model logical area by temporarily storing imported data in the working model logical area, wherein the imported data corresponds to incremental change data associated with a network of an electric utility;
   validating the incremental change data to provide validated incremental change data, wherein the validation is at least partially based on connectivity between assets of the electric utility in the network, wherein the validation of the incremental change data includes validating an integrity of the incremental change data between the assets connected to each other;
   associating version information that is based at least in part on a timestamp with the validated incremental change data, wherein the timestamp is associated with a time of the importing of the imported data; and
   permanently storing the validated incremental change data and associated version information in the permanent model logical area.

2. The method of claim 1, further comprising:
   providing a full model logical area in the database;
   importing full model data into the full model logical area;
   further validating the incremental change data based at least in part on the full model data;
   merging the validated incremental change data with data stored in the working model logical area; and
   storing the merged data in the full model logical area.

3. The method of claim 2, wherein validation is based at least in part on a profile of a standard model.

4. A method for controlling operation of a network, comprising:
   providing a database;
   dividing the database into plural logical areas including at least a working model logical area and a permanent model logical area, wherein the imported data corresponds to incremental change data associated with a network of an electric utility;
   importing data into the working model logical area by temporarily storing imported data in the working model logical area;
   validating the incremental change data to provide validated incremental change data, wherein the validation is at least partially based on connectivity between assets of the electric utility in the network, wherein the validation of the incremental change data includes validating an integrity of the incremental change data between the assets connected to each other;
   associating version information that is based at least in part on a timestamp with the validated incremental change data, wherein the timestamp is associated with a time of the importing of the imported data;
   permanently storing the validated incremental change data and associated version information as version controlled data in the permanent model logical area; and
   exporting the version control data for use by network applications.

5. An apparatus for controlling operation of a network, comprising:
   a database divided into plural logical areas including at least a working model logical area and a permanent model logical area by temporarily storing imported data in the working model logical area, wherein the imported data corresponds to incremental change data associated with a network of an electric utility;
   a data import manager for receiving data into the working model logical area;
   a validation manager configured to validate the incremental change data to provide validated incremental change data, wherein the validation is at least partially based on connectivity between assets of the electric utility in the network, wherein the validation of the incremental change data includes validating an integrity of the incremental change data between the assets connected to each other;
   a version control configured to associate version information based at least in part on a timestamp with the data received by said data import manager, wherein the timestamp is associated with a time of the importing of the imported data; and
   an archive manager configured to permanently store the validated incremental change data and associated version information as version controlled data in the permanent model logical area of the database.

6. The apparatus as in claim 5, further comprising:
   a full model logical area in said database;
   wherein the validation manager is configured to further validate the incremental change data received by said import manager based at least in part on data stored in said full model logical area;
   a baseline manager configured to merge the validated incremental change data with data stored in the working model logical area; and
   a database manager configured to store the merged data in the full model logical area.

* * * * *